(12) United States Patent
Kobilka et al.

(10) Patent No.: US 11,267,936 B2
(45) Date of Patent: *Mar. 8, 2022

(54) LACTIDE COPOLYMERS AND RING-OPENED LACTIDE COPOLYMERS

(71) Applicant: International Business Machines Corporation, Armonk, NY (US)

(72) Inventors: Brandon M. Kobilka, Fishkill, NY (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/775,874

(22) Filed: Jan. 29, 2020

(65) Prior Publication Data

US 2020/0165381 A1 May 28, 2020

Related U.S. Application Data

(63) Continuation of application No. 16/252,792, filed on Jan. 21, 2019, now Pat. No. 10,590,236, which is a
(Continued)

(51) Int. Cl.
*C08G 63/688* (2006.01)
*C08G 63/08* (2006.01)
(Continued)

(52) U.S. Cl.
CPC ......... *C08G 63/6886* (2013.01); *C08G 59/26* (2013.01); *C08G 59/302* (2013.01);
(Continued)

(58) Field of Classification Search
CPC ........ C08L 63/00; C08L 67/025; C08L 67/04; C08L 71/00; C09D 163/00;
(Continued)

(56) References Cited

U.S. PATENT DOCUMENTS 4,065,428 A 12/1977 Deets
4,983,745 A 1/1991 Muller
(Continued)

FOREIGN PATENT DOCUMENTS

CN 101225224 A 7/2008
CN 104371082 A 2/2015
(Continued)

OTHER PUBLICATIONS

"Altuglas International and NatureWorks Launch Worldwide Marketing Collaboration for New High Performance Alloys Incorporating Ingeo(TM) Biopolymers", globenewswire.com (online), Dec. 11, 2012, 2 pages, URL:globenewswire.com/news-release/2012/12/11/510816/10015271/en/Altuglas-International-and-NatureWorks-Launch-Worldwide-Marketing-Collaboration-for-New-High-Performance-Alloys-Incorporating-Ingeo-TM-Biopolymers.html.
(Continued)

*Primary Examiner* — Kregg T Brooks
(74) *Attorney, Agent, or Firm* — Kelsey M. Skodje

(57) ABSTRACT

An article of manufacture. The article of manufacture includes a ring-opened lactide copolymer. The ring-opened lactide copolymer is formed in a process that includes reacting a functionalized lactide monomer with a BPA-derived monomer. The reaction forms a lactide copolymer, which is reacted to form the ring-opened lactide copolymer.

15 Claims, 5 Drawing Sheets

Related U.S. Application Data continuation of application No. 15/453,104, filed on Mar. 8, 2017, now Pat. No. 10,202,489.

(51) Int. Cl.
| | |
|---|---|
| C08G 65/26 | (2006.01) |
| C08G 59/26 | (2006.01) |
| C08L 67/02 | (2006.01) |
| C08G 59/62 | (2006.01) |
| C09D 163/00 | (2006.01) |
| C09J 163/00 | (2006.01) |
| C08L 71/00 | (2006.01) |
| C08L 63/00 | (2006.01) |
| C09D 171/00 | (2006.01) |
| C09J 171/00 | (2006.01) |
| C08G 59/30 | (2006.01) |
| C08G 65/324 | (2006.01) |
| C09D 167/04 | (2006.01) |
| C08G 63/85 | (2006.01) |
| C09D 167/02 | (2006.01) |
| C09J 167/02 | (2006.01) |

(52) U.S. Cl.
CPC ......... *C08G 59/621* (2013.01); *C08G 59/625* (2013.01); *C08G 63/08* (2013.01); *C08G 63/85* (2013.01); *C08G 65/26* (2013.01); *C08G 65/2609* (2013.01); *C08G 65/2612* (2013.01); *C08G 65/324* (2013.01); *C08L 63/00* (2013.01); *C08L 67/025* (2013.01); *C08L 71/00* (2013.01); *C09D 163/00* (2013.01); *C09D 167/025* (2013.01); *C09D 167/04* (2013.01); *C09D 171/00* (2013.01); *C09J 163/00* (2013.01); *C09J 167/025* (2013.01); *C09J 171/00* (2013.01)

(58) Field of Classification Search
CPC   C09D 167/025; C09D 167/04; C09D 171/00; C09J 163/00; C09J 171/00; C08G 59/22; C08G 59/26; C08G 59/62; C08G 59/302; C08G 59/625; C08G 63/08; C08G 63/85; C08G 63/6886; C07D 303/00–48; C07D 319/00; C07D 319/10; C07D 319/12
See application file for complete search history.

(56) References Cited

U.S. PATENT DOCUMENTS

| | | | |
|---|---|---|---|
| 4,994,587 | A | 2/1991 | Notermann |
| 5,137,953 | A | 8/1992 | Fuhr |
| 5,852,117 | A | 12/1998 | Schoenberg |
| 6,316,581 | B1 | 11/2001 | Gross |
| 6,339,166 | B1 | 1/2002 | Allcock |
| 6,740,731 | B2 | 5/2004 | Bigg |
| 7,071,288 | B2 | 7/2006 | Smith |
| 7,709,569 | B2 | 5/2010 | Rafailovich |
| 8,741,877 | B2 | 6/2014 | Moller |
| 9,029,497 | B2 | 5/2015 | Li |
| 9,169,334 | B2 | 10/2015 | Stewart |
| 9,187,597 | B1 | 11/2015 | Boday |
| 9,193,818 | B1 | 11/2015 | Boday |
| 9,228,044 | B2 | 1/2016 | Boday |
| 9,260,550 | B1 | 2/2016 | Boday |
| 9,346,915 | B2 | 5/2016 | Nemoto |
| 9,422,386 | B2 | 8/2016 | Boday |
| 9,534,116 | B2 | 1/2017 | Zhu |
| 10,035,877 | B1 | 7/2018 | Kobilka |
| 10,072,121 | B1 | 9/2018 | Kobilka |
| 10,202,489 | B2 | 2/2019 | Kobilka |
| 2005/0080223 | A1 | 4/2005 | Tuominen |
| 2006/0264573 | A1 | 11/2006 | Bennett |
| 2006/0270779 | A1 | 11/2006 | Mochizuki |
| 2008/0114132 | A1 | 5/2008 | Daly |
| 2009/0054619 | A1 | 2/2009 | Baker |
| 2009/0259000 | A1 | 10/2009 | Urakami |
| 2009/0306333 | A1 | 12/2009 | Jing |
| 2010/0028568 | A1 | 2/2010 | Weaver |
| 2013/0035429 | A1 | 2/2013 | Tajima |
| 2013/0302620 | A1 | 11/2013 | Fenn |
| 2013/0317149 | A1 | 11/2013 | Zhao |
| 2014/0213732 | A1 | 7/2014 | Stewart |
| 2015/0018493 | A1 | 1/2015 | Mehrkhodavandi |
| 2015/0018497 | A1 | 1/2015 | Farrugia |
| 2015/0284506 | A1 | 10/2015 | Boday |
| 2016/0215079 | A1 | 7/2016 | Boday |
| 2017/0022320 | A1 | 1/2017 | O'Hare |
| 2018/0258218 | A1 | 9/2018 | Kobilka |
| 2019/0153153 | A1 | 5/2019 | Kobilka |

FOREIGN PATENT DOCUMENTS

| | | |
|---|---|---|
| EP | 0765889 A1 | 4/1997 |
| EP | 0964027 B1 | 5/2004 |
| EP | 2013288 B1 | 2/2013 |
| KR | 1020130048986 A | 5/2013 |
| WO | 9001521 A1 | 2/1990 |
| WO | 03027175 A1 | 4/2003 |
| WO | 2012015128 A1 | 2/2012 |
| WO | 2012169761 A2 | 12/2012 |
| WO | 2016134178 A1 | 8/2016 |

OTHER PUBLICATIONS

Abayasinghe et al., Terpolymers from Lactide and Bisphenol A Derivatives: Introducing Renewable Resource Monomers into Commodity Thermoplastics, Macromolecules, vol. 36, No. 26, Dec. 2003, pp. 9681-9683, American Chemical Society, Washington, D.C.

Britner et al., Self-Activation of Poly(methylenelactide) through Neighboring-Group Effects: A Sophisticated Type of Reactive Polymer, Macromolecules, vol. 48, No. 11, May 2015, pp. 3516-3522, American Chemical Society, Washington, D.C.

Buffet et al., "Alkaline earth metal amide complexes containing a cyclen-derived (NNNN) macrocyclic ligand: synthesis, structure, and ring-opening polymerization activity towards lactide monomers", New Journal of Chemistry, vol. 35, No. 10, Jul. 2011, pp. 2253-2257, Royal Society of Chemistry, London.

Fuoco et al., A Route to Aliphatic Poly(ester)s with Thiol Pendant Groups: From Monomer Design to Editable Porous Scaffolds, BioMacromolecules, Feb. 2016, vol. 17, No. 4, pp. 1383-1394, American Chemical Society Publications, Washington, D.C.

Gerhardt et al., Functional Lactide Monomers: Methodology and Polymerization, Biomacromolecules, vol. 7, No. 6, published on web May 24, 2006, pp. 1735-1742, American Chemical Society, Washington, D.C.

IBM, IBM Academy of Technology, IBM.com (online), accessed Dec. 9, 2016, 2 pages.

Jing et al., A Bifunctional Monomer Derived from Lactide for Toughening Polylactide, Journal of the American Chemical Society (JACS) Communications, Sep. 2008, vol. 130, Issue 42, pp. 13826-13827, American Chemical Society Publications, Washington, D.C.

Li et al., Highly-effective Flame Retardancy of Poly(lactide) Composite Achieved Through Incorporation of Amorphous Nickel Phosphate Microparticle, Polymer-Plastics Technology and Engineering, Aug. 2014, vol. 53, Issue 15, pp. 1533-1541, Taylor & Francis Group, an Informa Business, London.

Mauldin et al., Acrylic Platform from Renewable Resources via a Paradigm Shift in Lactide Polymerization, ACS MarcoLetters, vol. 5, Apr. 2016, pp. 544-546, American Chemical Society, Washington, D.C.

Noga et al., Synthesis and Modification of Functional Poly(lactide) Copolymers: Toward Biofunctional Materials, Biomacromolecules, vol. 9, No. 7, Jun. 2008, pp. 2056-2062, American Chemical Society, Washington, D.C.

(56) References Cited

OTHER PUBLICATIONS

Partlo III, Reductively Degradable Polymeric Biomaterials, Dissertation, Jan. 2015, 111 pages, University of Minnesota, USA.

Price et al., "Flame retardance of poly(methyl methacrylate) modified with phosphorus-containing compounds", Polymer Degradation and Stability, Mar. 2002, vol. 77, Issue 2, pp. 227-233, Elsevier Science Ltd, Amsterdam, Netherlands.

Scheibelhoffer et al., "Synthesis, Polymerization and Copolymerization of Dimethyleneglycolide and Methylenemethylglycolide", Polymer Preprints, vol. 10, No. 2, Sep. 1969, pp. 1375-1380, Division of Polymer Chemistry, American Chemical Society, Washington D.C.

U.S. Appl. No. 15/452,880, to Brandon M. Kobilka et al., entitled, Matrix-Bondable Lactide Monomors For Polylactide Synthesis, assigned to International Business Machines Corporation, 39 pages, filed Mar. 8, 2017.

U.S. Appl. No. 15/452,914, to Brandon M. Kobilka et al., entitled, Flame Retardant Lactide Monomors For Polylactide Synthesis, assigned to International Business Machines Corporation, 47 pages, filed Mar. 8, 2017.

U.S. Appl. No. 15/452,996, to Brandon M. Kobilka et al., entitled, Bottlebrush Polymers Derived From Poly(Methylidenelactide), assigned to International Business Machines Corporation, 23 pages, filed Mar. 8, 2017.

U.S. Appl. No. 15/453,104, to Brandon M. Kobilka et al., entitled, Lactide Copolymers And Ring-Opened Lactide Copolymers, assigned to International Business Machines Corporation, 24 pages, filed Mar. 8, 2017.

Verduzco et al., Structure, function, self-assembly, and applications of bottlebrush copolymers, Chemical Society Review, Feb. 2015, vol. 44, pp. 2405-2420, The Royal Society of Chemistry, UK.

"UL 94", Underwriters Laboratories inc., Jul. 10, 1998, Fifth Edition, © 1973, 1998 Underwriters Laboratories Inc., 44 pages.

Morgan et al., "Flame Retardant Polymer Nanocomposites", Wiley Publishers, pp. 7-8, Apr. 6, 2007.

Kobilka et al., "Flame Retardant Lactide Monomors for Polylactide Synthesis," U.S. Appl. No. 16/585,356, filed Sep. 27, 2019.

Wright et al., "Synthesis of Functionalized Poly(lactic acid) Using 2-Bromo-3-hydroxypropionic Acid", Macromolecules, 49, 2016, © 2016 American Chemical Society, pp. 2028-2038.

List of IBM Patents or Patent Applications Treated as Related, Signed Jan. 29, 2020, 2 pages.

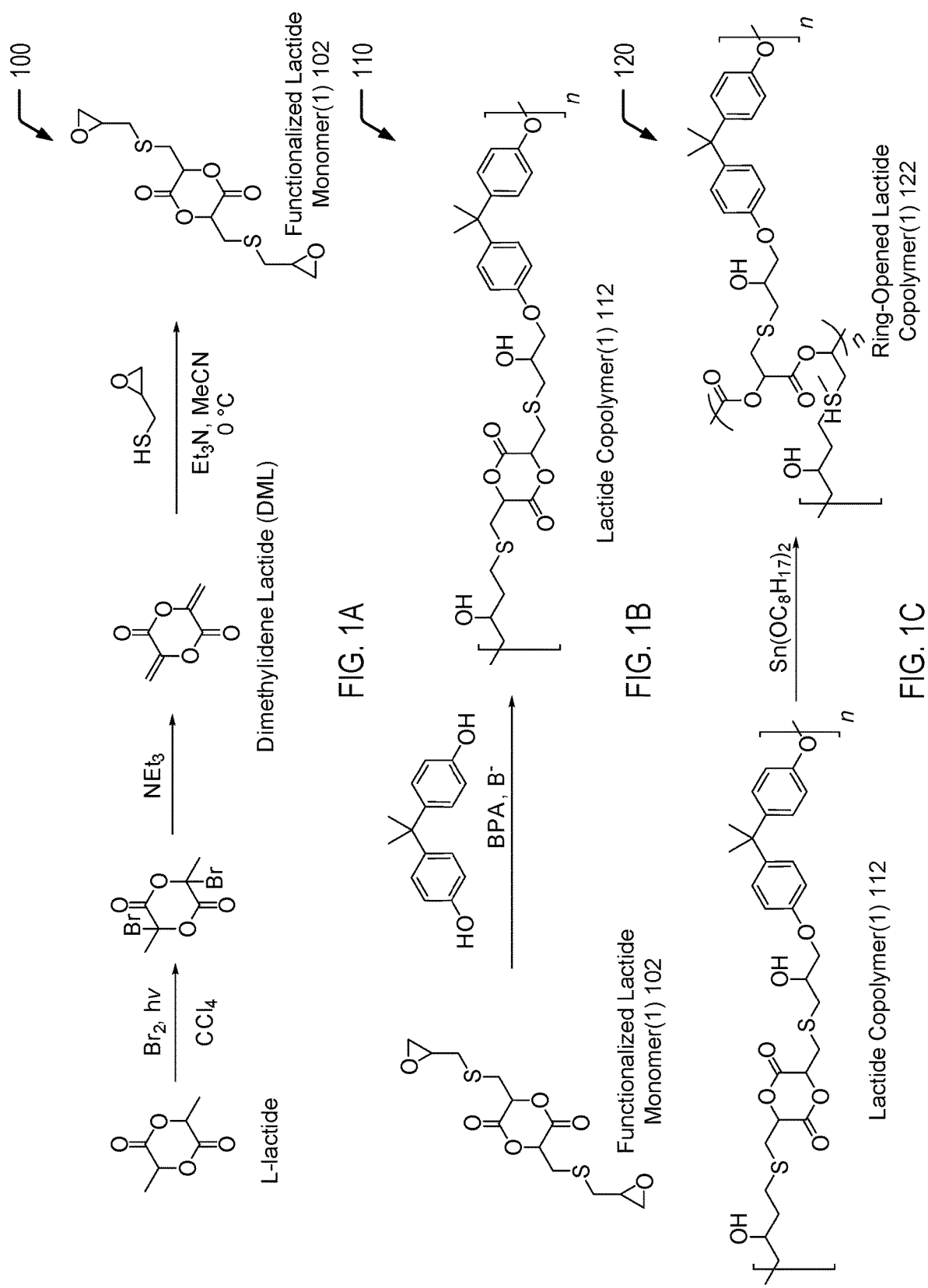

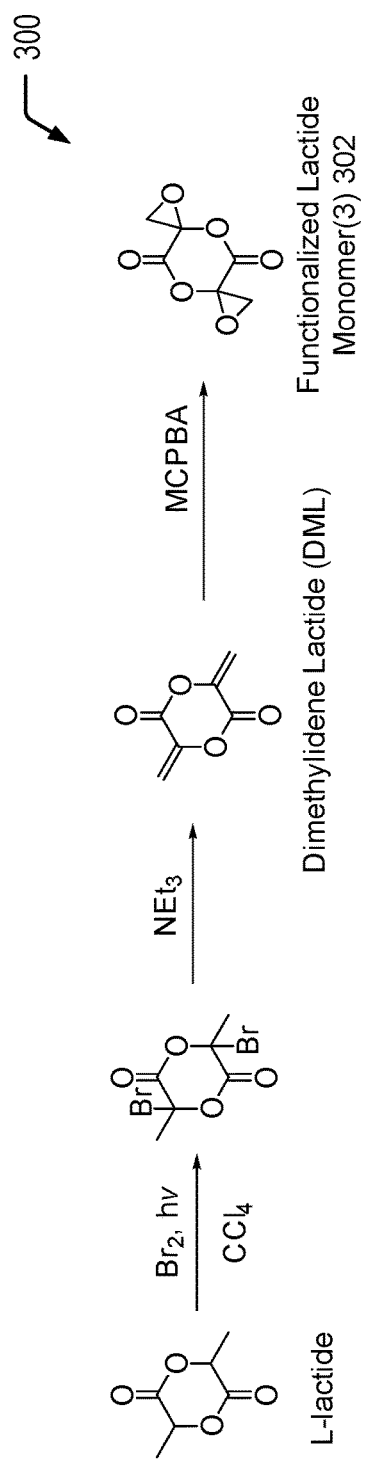
FIG. 3A
FIG. 3B
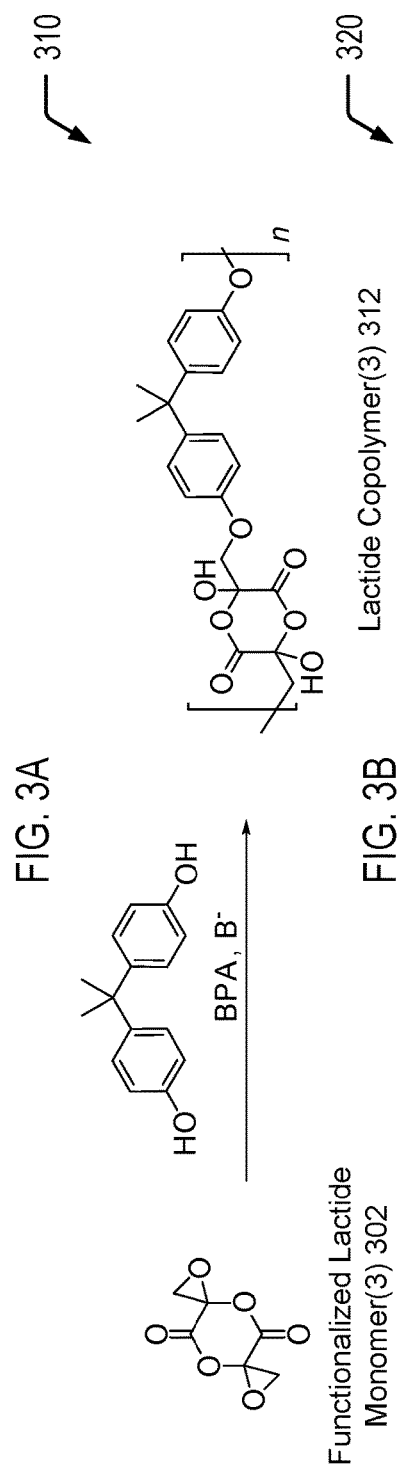
FIG. 3C

LACTIDE COPOLYMERS AND RING-OPENED LACTIDE COPOLYMERS

BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

SUMMARY

According to an embodiment, an article of manufacture is disclosed. The article of manufacture includes a ring-opened lactide copolymer. The article of manufacture can be a coating, an electrical insulator, a fiber-reinforced plastic, or an adhesive. The ring-opened lactide copolymer can be a component of a resin, such as a thermoset epoxy resin. The ring-opened lactide copolymer can be crosslinked by moieties such as epoxies, isocyanates, carbonates, esters, or combinations thereof. The ring-opened lactide copolymer can be formed by a process that includes reacting a functionalized lactide monomer with a difunctional epoxide monomer, such as bisphenol A diglycidyl ether.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 1A is a chemical reaction diagram illustrating an example of a process of forming a first functionalized lactide monomer that is derived from a dimethylidene lactide molecule, according to an embodiment.

FIG. 1B is a chemical reaction diagram illustrating an example of a process of utilizing the first functionalized lactide monomer of FIG. 1A to form a first lactide copolymer.

FIG. 1C is a chemical reaction diagram illustrating an example of a process of forming a first ring-opened lactide copolymer from the first lactide copolymer of FIG. 1B, according to one embodiment.

FIG. 3A is a chemical reaction diagram illustrating an example of a process of forming a third functionalized lactide monomer that is derived from a dimethylidene lactide molecule, according to an embodiment.

FIG. 3B is a chemical reaction diagram illustrating an example of a process of utilizing the third functionalized lactide monomer of FIG. 3A to form a second lactide copolymer.

FIG. 3C is a chemical reaction diagram illustrating an example of a process of forming a third ring-opened lactide copolymer from the third lactide copolymer of FIG. 3B, according to one embodiment.

DETAILED DESCRIPTION

Figure 2A:
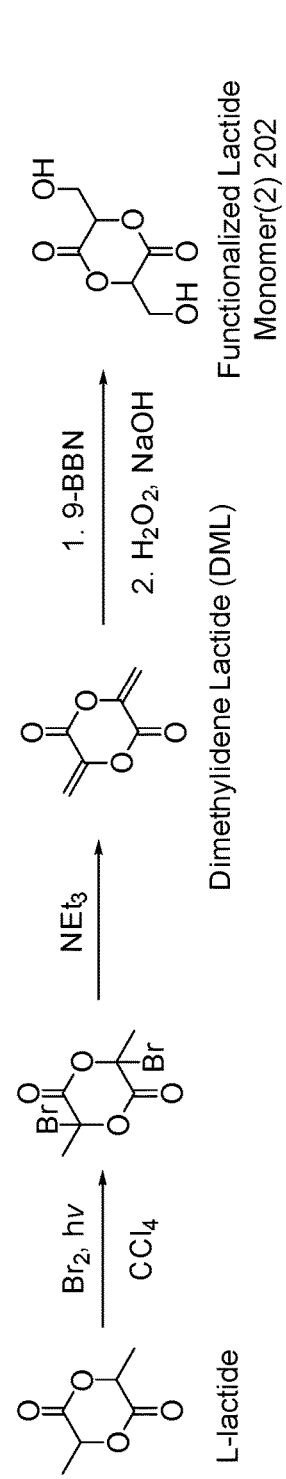
FIG. 2A is a chemical reaction diagram illustrating an example of a process of forming a second functionalized lactide monomer that is derived from a dimethylidene lactide molecule, according to an embodiment.

The present disclosure describes functionalized lactide monomers derived from a dimethylidene lactide molecule, lactide copolymers formed from the functionalized lactide monomers, and ring-opened lactide copolymers formed from the lactide copolymers. In the present disclosure, an L-lactide molecule may be utilized to form a dimethylidene lactide molecule. The exocyclic double bonds on the dimethylidene lactide (DML) molecule can undergo further functionalization to create lactide monomers with functional groups (also referred to herein as "functionalized lactide monomers"). In some cases, the functionalized lactide monomers may be polymerized with a bisphenol A (BPA) monomer or a BPA derivative monomer, such as bisphenol A diglycidyl ether (DGEBA), to form lactide copolymers. In other cases, the lactide copolymers may undergo ring-opening polymerization to form ring-opened lactide copolymers. While the present disclosure describes functionalization of DML molecules with epoxide groups and hydroxyl groups for subsequent formation of lactide copolymers, it will be appreciated that the DML molecules may be functionalized with alternative and/or additional groups. To illustrate, the functionalized lactide monomers of the present disclosure may include lactide monomers functionalized with vinyl group(s), amine group(s), anhydride(s), etc., among other alternatives.

Referring to FIG. 1A, a chemical reaction diagram 100 illustrates an example of a process of forming a first functionalized lactide monomer 102. FIG. 1B is a chemical reaction diagram 110 illustrating that, in some cases, the first functionalized lactide monomer 102 of FIG. 1A may be utilized to form a first lactide copolymer 112. FIG. 1C is a chemical reaction diagram 120 illustrating that, in some cases, the first lactide copolymer 112 of FIG. 1B may be utilized to form a first ring-opened lactide copolymer 122.

The first two chemical reactions depicted in FIG. 1A illustrate the formation of a dimethylidene lactide molecule from an L-lactide molecule. In a particular embodiment, formation of the dimethylidene lactide molecule may include radical bromination (depicted as $Br_2$, hv in FIG. 1A) in the presence to carbon tetrachloride ($CCl_4$). Subsequently, FIG. 1A illustrates that elimination with triethylamine ($NEt_3$) in a solvent such as dichloromethane (DCM) results in the formation of the dimethylidene lactide (DML) molecule.

As a prophetic example, the DML molecule may be formed by photobromination of the L-lactide molecule in a carbon tetrachloride ($CCl_4$) solution using a mercury vapor lamp (e.g., a H-100A-38-4 mercury vapor lamp from General Electric, Inc.). The dibrominated intermediate molecule may be dehydrobrominated by reaction with triethylamine ($NEt_3$) in a carefully dried ether. The resulting crude DML molecule may then be purified according to a purification procedure known to one of ordinary skill in the art.

The third chemical reaction depicted in FIG. 1A illustrates that the first functionalized lactide monomer 102 may be synthesized from the DML molecule. In a particular embodiment, the third chemical reaction of FIG. 1A may include chemically reacting 2-oxiranemethanethiol via a triethylamine-catalyzed Michael addition with DML to form the first functionalized lactide monomer 102, representing an example of a bisthioepoxide functionalized lactide molecule. As a prophetic example, to a solution of 2-Oxiranemethanethiol (2.1 eqiuv.), and triethylamine (0.3 equiv.) in anhydrous acetonitrile, may be added a solution of DML (1.0 equiv.) in anhydrous acetonitrile, dropwise at 0° C., under an inert atmosphere. The reaction mixture may be stirred for 1.5 hours at 0° C., and then concentrated by about 80% in vacuo. The concentrated solution may be dissolved in ethyl acetate and washed with 0.1 M HCl (×3), dried over $MgSO_4$, filtered, and the solvents removed in vacuo. The resulting solid may be purified by column chromatography or recrystallization.

Referring to FIG. 1B, a chemical reaction diagram 110 illustrates that the first functionalized lactide monomer 102 of FIG. 1A may be used to form a first lactide copolymer 112, representing a first example of a lactide-BPA copolymer. In a particular embodiment, the first functionalized lactide monomer 102 may be reacted with BPA under basic conditions (depicted as "B$^-$" in FIG. 1B) to form the first lactide copolymer 112. In some cases, the first lactide copolymer 112 of FIG. 1B may be used in resins. In other cases, the first lactide copolymer 112 of FIG. 1B may be reacted further to make a cross-linked poly(lactic acid) network, as illustrated and described further herein with respect to FIG. 1C.

Referring to FIG. 1C, a chemical reaction diagram 120 illustrates an example of a process of forming a first ring-opened lactide copolymer 122 from the first lactide copolymer 112 of FIG. 1B. In the example of FIG. 1C, synthesis of the first ring-opened lactide copolymer 122 may include reacting the first lactide copolymer 112 with a tin(II) octanoate material (depicted as "$Sn(OC_8H^{17})_2$" in FIG. 1C) under ring-opening polymerization conditions. The first ring-opened lactide copolymer 122 of FIG. 1C represents a first example of a cross-linked polymer that may be utilized as a renewable alternative for epoxy thermoset resins, such as coatings, electrical insulators, fiber-reinforced plastics, and structural adhesives, among other alternatives. In some cases, formulation of such a renewable thermoset material may take place before the cross-linking reaction depicted in FIG. 1C in order to incorporate additives, plasticizers, fillers, or combinations thereof (among other alternatives). Further, it will be appreciated that the first lactide copolymer 112 of FIG. 1B also includes free hydroxyl groups that can also be cross-linked further with other epoxy groups, isocyanates, carbonates, esters, etc. to from alternative thermoset materials.

Thus, FIGS. 1A-1C illustrate an example of a process of forming a functionalized lactide monomer and utilizing the functionalized lactide monomer to form a lactide copolymer (e.g., a BPA-lactide copolymer) or a ring-opened lactide copolymer. While not shown in the example of FIGS. 1A-1C, the lactide copolymers and/or ring-opened lactide copolymers may be utilized to form various articles of manufacture. As an example, the BPA-lactide copolymer depicted in FIG. 1B (prior to ring-opening polymerization) may be used in resins. As another example, the ring-opened BPA-lactide copolymer of FIG. 1C may be utilized as a renewable alternative for epoxy thermoset resins, such as coatings, electrical insulators, fiber-reinforced plastics, and structural adhesives, among other alternatives.

Figure 2B:
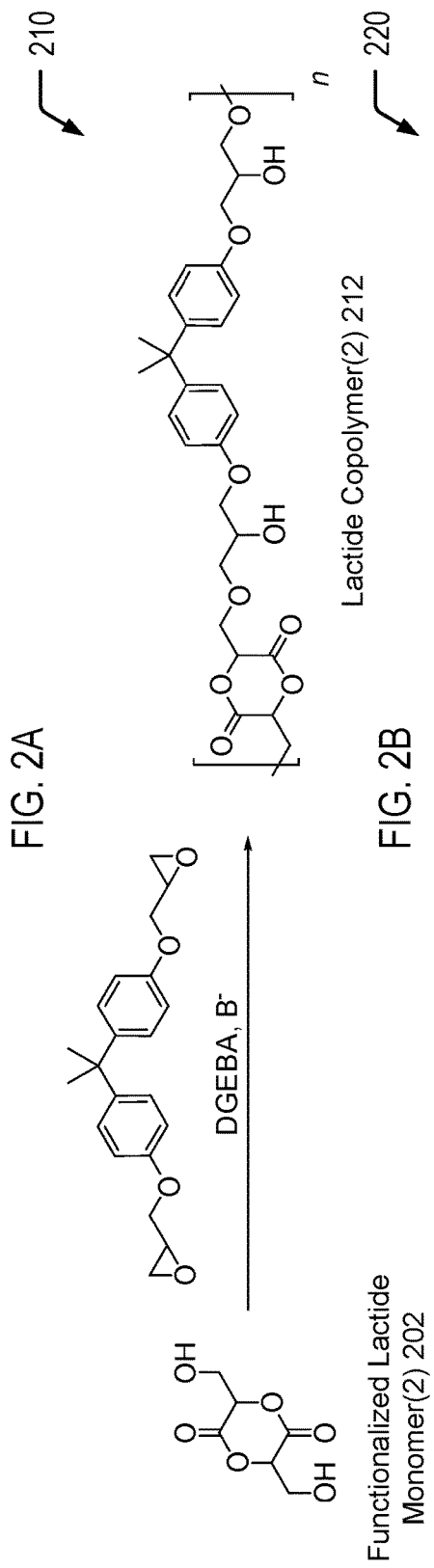
FIG. 2B is a chemical reaction diagram illustrating an example of a process of utilizing the first functionalized lactide monomer of FIG. 2A to form a second lactide copolymer.
Figure 2C:
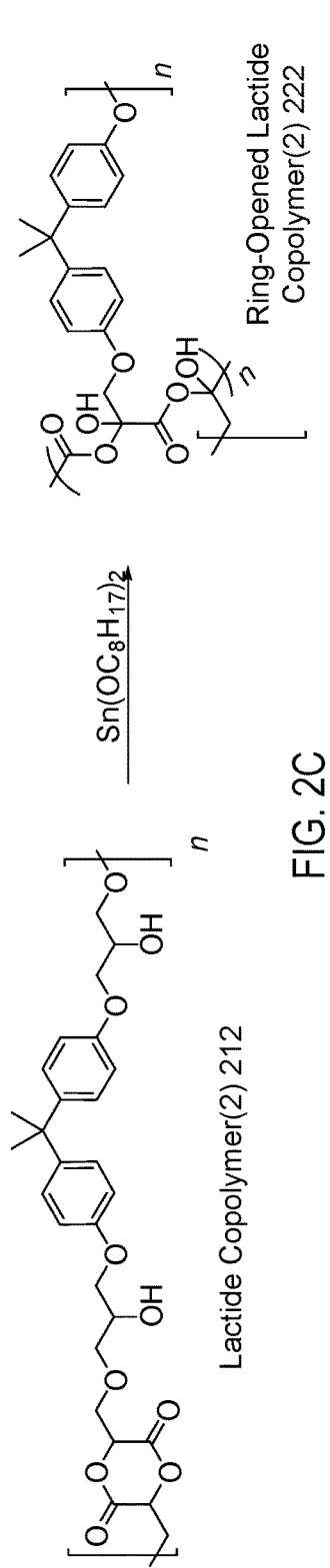
FIG. 2C is a chemical reaction diagram illustrating an example of a process of forming a second ring-opened lactide copolymer from the second lactide copolymer of FIG. 2B, according to one embodiment.

Referring to FIG. 2A, a chemical reaction diagram 200 illustrates an example of a process of forming a second functionalized lactide monomer 202. FIG. 2B is a chemical reaction diagram 210 illustrating that, in some cases, the first functionalized lactide monomer 202 of FIG. 2A may be utilized to form a second lactide copolymer 212. FIG. 2C is a chemical reaction diagram 220 illustrating that, in some cases, the second lactide copolymer 212 of FIG. 2B may be utilized to form a second ring-opened lactide copolymer 222.

The first two chemical reactions depicted in FIG. 2A illustrate the formation of a dimethylidene lactide molecule from an L-lactide molecule. The process of forming the dimethylidene lactide molecule may be similar to the process previously described herein with respect to FIG. 1A.

The second chemical reaction depicted in FIG. 2A illustrates that the second functionalized lactide monomer 202 may be synthesized from the DML molecule. In a particular embodiment, the second chemical reaction of FIG. 2A may include chemically reacting the DML molecule under hydroboration conditions to form the second functionalized lactide monomer 202, representing an example of a diol functionalized lactide molecule. While not shown in the example of FIG. 2A, in some cases, a protecting group may be utilized for the hydroxyl groups of the second functionalized lactide monomer 202. As a prophetic example, 9-BBN (0.5 M in THF, 2.1 equiv.) may be added dropwise over 30 min to a stirred and cooled (0° C.) solution of DML (1.0 equiv.) in THF (125 mL). The ice bath may be removed, and stirring may continue for 12 hours. The mixture may be cooled to 0° C. and quenched by dropwise addition of MeOH. Aqueous NaOH (2 M, >1.5 equiv.) and 30% $H_2O_2$ (>10.0 equiv.) may be poured into the stirred mixture. Stirring may be continued for 2 hours, and the mixture may be extracted with $Et_2O$. The combined organic extracts may be washed with brine, dried over $Na_2SO_4$, and the solvent may be removed in vacuo. The crude product may be purified through column chromatography.

Referring to FIG. 2B, a chemical reaction diagram 210 illustrates that the second functionalized lactide monomer 202 of FIG. 2A may be used to form a second lactide copolymer 212, representing a first example of a lactide-DGEBA copolymer. While FIG. 2A illustrates a particular embodiment in which the BPA derivative includes DGEBA, it will be appreciated that other di-functional epoxides may also be utilized. As an illustrative, non-limiting example, an alternative bis-epoxy material may include a cycloaliphatic diepoxide, such as ERL-4221 (3,4-Epoxycyclohexanemethyl 3,4-epoxycyclohexanecarboxylate), among other alternatives. In a particular embodiment, the second functionalized lactide monomer 202 may be reacted with DGEBA under basic conditions (depicted as "B$^-$" in FIG. 2B) to form the second lactide copolymer 212. In some cases, the second lactide copolymer 212 of FIG. 2B may be used in resins. In other cases, the second lactide copolymer 212 of FIG. 2B may be reacted further to make a cross-linked poly(lactic acid) network, as illustrated and described further herein with respect to FIG. 2C.

Referring to FIG. 2C, a chemical reaction diagram 220 illustrates an example of a process of forming a second ring-opened lactide copolymer 222 from the second lactide copolymer 212 of FIG. 2B. In the example of FIG. 2C, synthesis of the second ring-opened lactide copolymer 222 may include reacting the first lactide copolymer 212 with a tin(II) octanoate material (depicted as "$Sn(OC_8H_{17})_2$" in FIG. 2C) under ring-opening polymerization conditions. The second ring-opened lactide copolymer 222 of FIG. 2C represents a first example of a cross-linked polymer that may be utilized as a renewable alternative for epoxy thermoset resins, such as coatings, electrical insulators, fiber-reinforced plastics, and structural adhesives, among other alternatives. In some cases, formulation of such a renewable thermoset material may take place before the cross-linking reaction depicted in FIG. 2C in order to incorporate additives, plasticizers, fillers, or combinations thereof (among other alternatives). Further, it will be appreciated that the second lactide copolymer 212 of FIG. 2B also includes free hydroxyl groups that can also be cross-linked further with other epoxy groups, isocyanates, carbonates, esters, etc. to from alternative thermoset materials.

Thus, FIGS. 2A-2C illustrate an example of a process of forming a functionalized lactide monomer and utilizing the functionalized lactide monomer to form a lactide copolymer (e.g., a DGEBA-lactide copolymer) or a ring-opened lactide copolymer. While not shown in the example of FIGS. 2A-2C, the lactide copolymers and/or ring-opened lactide copolymers may be utilized to form various articles of manufacture. As an example, the DGEBA-lactide copolymer depicted in FIG. 2B (prior to ring-opening polymerization) may be used in resins. As another example, the ring-opened DGEBA-lactide copolymer of FIG. 2C may be utilized as a renewable alternative for epoxy thermoset resins, such as coatings, electrical insulators, fiber-reinforced plastics, and structural adhesives, among other alternatives.

Referring to FIG. 3A, a chemical reaction diagram 300 illustrates an example of a process of forming a third functionalized lactide monomer 302. FIG. 3B is a chemical reaction diagram 310 illustrating that, in some cases, the third functionalized lactide monomer 302 of FIG. 3A may be utilized to form a third lactide copolymer 312. FIG. 3C is a chemical reaction diagram 320 illustrating that, in some cases, the third lactide copolymer 312 of FIG. 3B may be utilized to form a third ring-opened lactide copolymer 322.

The first two chemical reactions depicted in FIG. 3A illustrate the formation of a dimethylidene lactide molecule from an L-lactide molecule. The process of forming the dimethylidene lactide molecule may be similar to the process previously described herein with respect to FIG. 1A. The third chemical reaction depicted in FIG. 3A illustrates that the third functionalized lactide monomer 302 may be synthesized from the DML molecule. In a particular embodiment, the third chemical reaction of FIG. 3A may include chemically reacting meta-chloroperbenzoic acid (MCPBA) with DML to form the third functionalized lactide monomer 302, representing an example of a bisepoxide-functionalized lactide molecule. As a prophetic example, MCPBA (meta-chloroperbenzoic acid, >2.0 equiv) and DML (1.0 equiv.) may be dissolved in dichloromethane. The reaction mixture may be heated with stirring, under reflux, for 24 hours. After completion, the mixture may be washed with a saturated solution of sodium bicarbonate and 10% aqueous sodium bisulfite. Subsequently, the organic phase may be dried over magnesium sulfate, filtered, and the solvents may be removed in vacuo. The resulting solid may be purified by recrystallization or column chromatography.

Referring to FIG. 3B, a chemical reaction diagram 310 illustrates that the third functionalized lactide monomer 302 of FIG. 3A may be used to form a third lactide copolymer 312, representing a second example of a lactide-BPA copolymer (that is different from the lactide-BPA copolymer depicted in FIG. 1B). In a particular embodiment, the third functionalized lactide monomer 302 may be reacted with BPA under basic conditions (depicted as "B⁻" in FIG. 3B) to form the third lactide copolymer 312. In some cases, the third lactide copolymer 312 of FIG. 3B may be used in resins. In other cases, the third lactide copolymer 312 of FIG. 3B may be reacted further to make a cross-linked poly(lactic acid) network, as illustrated and described further herein with respect to FIG. 3C.

Referring to FIG. 3C, a chemical reaction diagram 320 illustrates an example of a process of forming a third ring-opened lactide copolymer 322 from the third lactide copolymer 312 of FIG. 3B. In the example of FIG. 3C, synthesis of the third ring-opened lactide copolymer 322 may include reacting the third lactide copolymer 312 with a tin(II) octanoate material (depicted as "$Sn(OC_8H_{17})_2$" in FIG. 3C) under ring-opening polymerization conditions. The third ring-opened lactide copolymer 322 of FIG. 3C represents a third example of a cross-linked polymer that may be utilized as a renewable alternative for epoxy thermoset resins, such as coatings, electrical insulators, fiber-reinforced plastics, and structural adhesives, among other alternatives. In some cases, formulation of such a renewable thermoset material may take place before the cross-linking reaction depicted in FIG. 3C in order to incorporate additives, plasticizers, fillers, or combinations thereof (among other alternatives). Further, it will be appreciated that the third lactide copolymer 312 of FIG. 3B also includes free hydroxyl groups that can also be cross-linked further with other epoxy groups, isocyanates, carbonates, esters, etc. to from alternative thermoset materials.

Thus, FIGS. 3A-3C illustrate an example of a process of forming a functionalized lactide monomer and utilizing the functionalized lactide monomer to form a lactide copolymer (e.g., a BPA-lactide copolymer) or a ring-opened lactide copolymer. While not shown in the example of FIGS. 3A-3C, the lactide copolymers and/or ring-opened lactide copolymers may be utilized to form various articles of manufacture. As an example, the BPA-lactide copolymer depicted in FIG. 3B (prior to ring-opening polymerization) may be used in resins. As another example, the ring-opened BPA-lactide copolymer of FIG. 3C may be utilized as a renewable alternative for epoxy thermoset resins, such as coatings, electrical insulators, fiber-reinforced plastics, and structural adhesives, among other alternatives.

Figure 4:
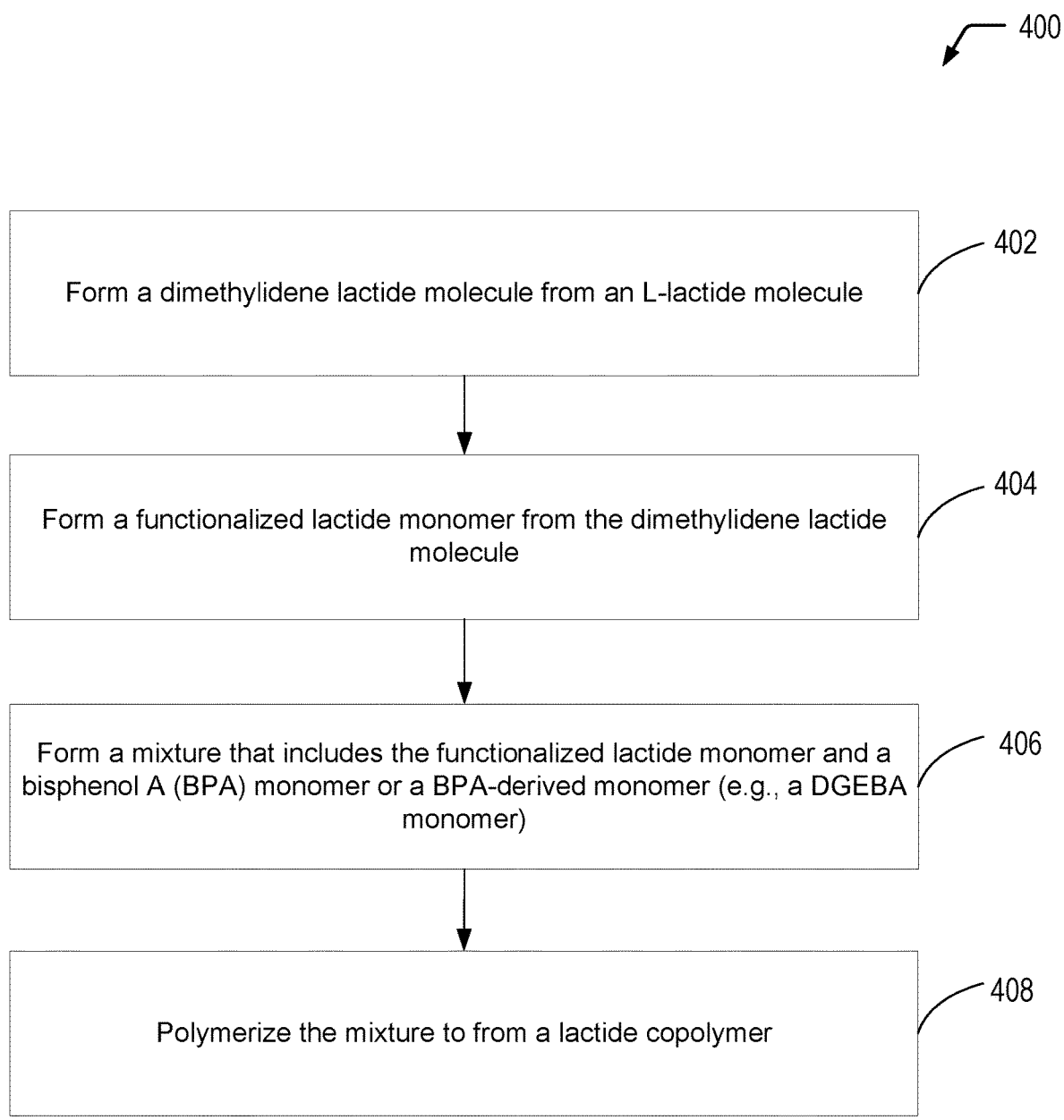
FIG. 4 is a flow diagram depicting a particular embodiment of a process of utilizing a functionalized lactide monomer derived from a dimethylidene lactide molecule to form a lactide copolymer.

Referring to FIG. 4, a flow diagram illustrates a particular embodiment of a process 400 of utilizing a functionalized lactide monomer derived from a dimethylidene lactide molecule to form a lactide copolymer. While not shown in the example of FIG. 4, the process 400 may further include forming an article of manufacture from the lactide copolymer (e.g., a resin material).

The process 400 includes forming a dimethylidene lactide molecule from an L-lactide molecule, at 402. For example, referring to FIG. 1A, the dimethylidene lactide molecule may be formed from the L-lactide molecule by radical bromination of the L-lactide molecule, followed by elimination with triethylamine ($NEt_3$).

The process 400 includes forming a functionalized lactide monomer from the dimethylidene lactide molecule, at 404. For example, referring to FIG. 1A, the dimethylidene lactide molecule may be utilized to form the first functionalized lactide monomer 102, representing an example of a bisthioepoxide-functionalized lactide monomer. As another example, referring to FIG. 2A, the dimethylidene lactide molecule may be utilized to form the second functionalized lactide monomer 202, representing an example of a diol-functionalized lactide monomer. As another example, referring to FIG. 3A, the dimethylidene lactide molecule may be utilized to form the third functionalized lactide monomer 302, representing an example of a bisepoxide-functionalized lactide monomer.

The process 400 includes forming a mixture that includes the functionalized lactide monomer and a BPA monomer or a BPA-derived monomer, at 406. The process 400 also includes polymerizing the mixture to form a lactide copolymer, at 408.

As an example, referring to FIG. 1B, the first functionalized lactide monomer 102 of FIG. 1A may be reacted with BPA under basic conditions (depicted as "B−" in FIG. 1B) to form the first lactide copolymer 112. In some cases, the first lactide copolymer 112 of FIG. 1B may be used to form an article of manufacture that includes a resin material. In other cases, as illustrated and further described herein with respect to FIG. 5, the first lactide copolymer 112 of FIG. 1B may be used to form the ring-opened lactide copolymer 122 of FIG. 1C.

As another example, referring to FIG. 2B, the second functionalized lactide monomer 202 of FIG. 2A may be reacted with DGEBA under basic conditions (depicted as "B−" in FIG. 2B) to form the second lactide copolymer 212. In some cases, the second lactide copolymer 212 of FIG. 2B may be used to form an article of manufacture that includes a resin material. In other cases, as illustrated and further described herein with respect to FIG. 5, the second lactide copolymer 212 of FIG. 2B may be used to form the ring-opened lactide copolymer 222 of FIG. 2C.

As yet another example, referring to FIG. 3B, the third functionalized lactide monomer 302 of FIG. 3A may be reacted with BPA under basic conditions (depicted as "B−" in FIG. 3B) to form the third lactide copolymer 312. In some cases, the third lactide copolymer 312 of FIG. 3B may be used to form an article of manufacture that includes a resin material. In other cases, as illustrated and further described herein with respect to FIG. 5, the third lactide copolymer 312 of FIG. 3B may be used to form the ring-opened lactide copolymer 322 of FIG. 3C.

Thus, FIG. 4 illustrates an example of a process of utilizing a functionalized lactide monomer derived from a dimethylidene lactide molecule to form a lactide copolymer. As illustrated and further described herein with respect to FIG. 5, in some cases, the lactide copolymer may be subsequently utilized to form a ring-opened lactide copolymer.

Figure 5:
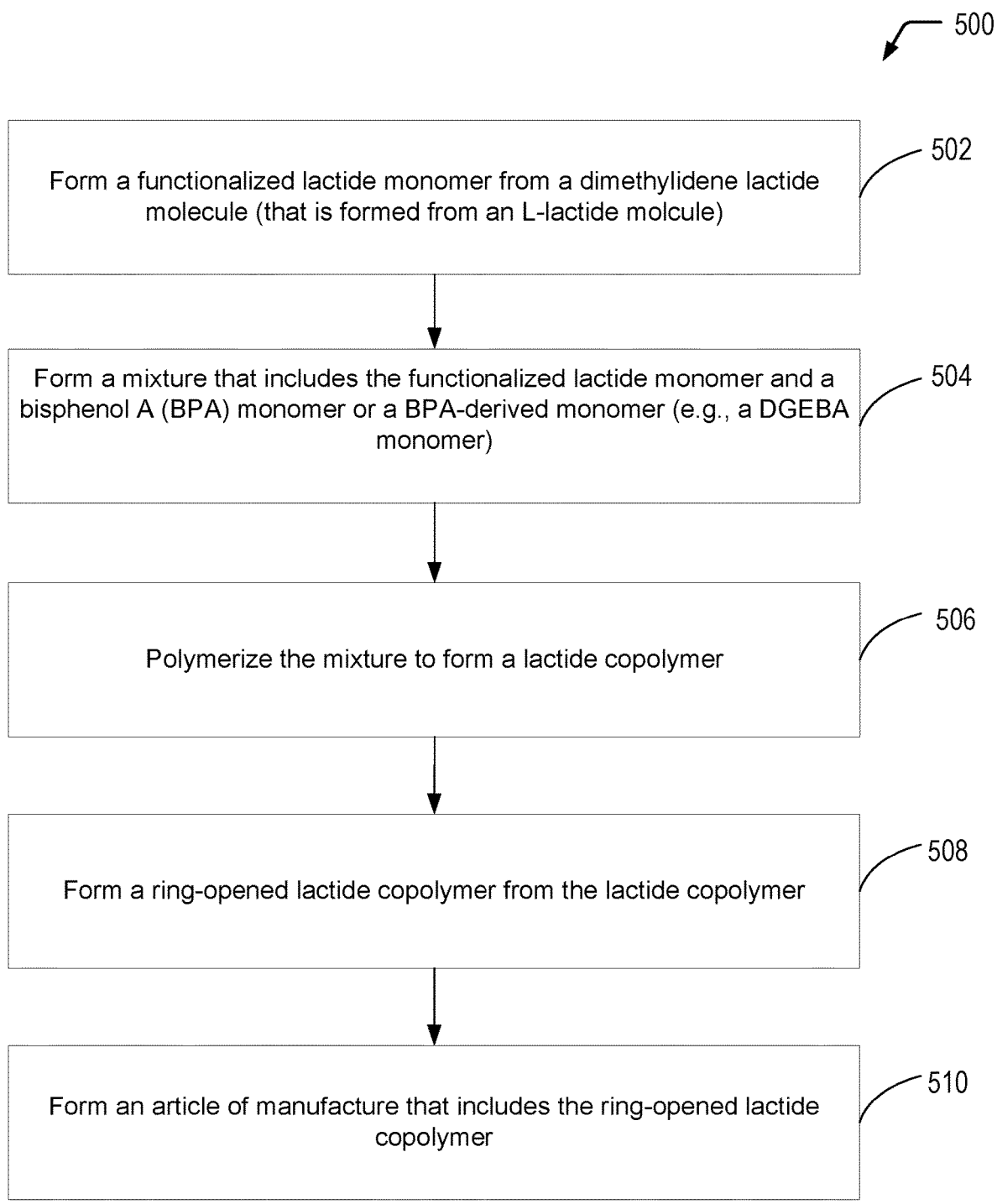
FIG. 5 is a flow diagram depicted a particular embodiment of a process of utilizing a functionalized lactide monomer derived from a dimethylidene lactide molecule to form a lactide copolymer and utilizing the lactide copolymer to form a ring-opened lactide copolymer.

Referring to FIG. 5, a flow diagram illustrates a particular embodiment of a process 500 of utilizing the lactide copolymer formed according to the process 400 depicted in FIG. 4 to form a ring-opened lactide copolymer. In the particular embodiment depicted in FIG. 5, the process 500 further includes forming an article of manufacture from the ring-opened lactide copolymer.

The process 500 includes forming a functionalized lactide monomer from a dimethylidene lactide molecule (that is formed from a renewable L-lactide molecule), at 502.

For example, referring to FIG. 1A, the dimethylidene lactide molecule may be utilized to form the first functionalized lactide monomer 102, representing an example of a bisthioepoxide-functionalized lactide monomer. As another example, referring to FIG. 2A, the dimethylidene lactide molecule may be utilized to form the second functionalized lactide monomer 202, representing an example of a diol-functionalized lactide monomer. As another example, referring to FIG. 3A, the dimethylidene lactide molecule may be utilized to form the third functionalized lactide monomer 302, representing an example of a bisepoxide-functionalized lactide monomer.

The process 500 includes forming a mixture that includes the functionalized lactide monomer and a BPA monomer or a BPA-derived monomer, at 504. The process 500 also includes polymerizing the mixture to form a lactide copolymer, at 506.

As an example, referring to FIG. 1B, the first functionalized lactide monomer 102 of FIG. 1A may be reacted with BPA under basic conditions (depicted as "B−" in FIG. 1B) to form the first lactide copolymer 112. As another example, referring to FIG. 2B, the second functionalized lactide monomer 202 of FIG. 2A may be reacted with DGEBA under basic conditions (depicted as "B−" in FIG. 2B) to form the second lactide copolymer 212. As yet another example, referring to FIG. 3B, the third functionalized lactide monomer 302 of FIG. 3A may be reacted with BPA under basic conditions (depicted as "B−" in FIG. 3B) to form the third lactide copolymer 312.

The process 500 further includes forming a ring-opened lactide copolymer from the lactide copolymer, at 508. As an example, referring to FIG. 1C, the first lactide copolymer 112 may be utilized to form the first ring-opened lactide copolymer 122. As another example, referring to FIG. 2C, the second lactide copolymer 212 of FIG. 2B may be utilized to form the second ring-opened lactide copolymer 222. As yet another example, the third lactide copolymer 312 of FIG. 3B may be utilized to form the third ring-opened lactide copolymer 322.

In the particular embodiment depicted in FIG. 5, the process 500 further includes forming an article of manufacture that includes the ring-opened lactide copolymer, at 510. For example, the article of manufacture may include a renewable alternative for epoxy thermoset resins, such as coatings, electrical insulators, fiber-reinforced plastics, and structural adhesives, among other alternatives.

Thus, FIG. 5 illustrates an example of a process of utilizing the lactide copolymer formed according to the process described herein with respect to FIG. 4 to form a ring-opened lactide copolymer. FIG. 5 further illustrates that, in some cases, the ring-opened lactide copolymers of the present disclosure may be utilized to form articles of manufacture that represent renewable alternatives to some existing petroleum-derived materials.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An article of manufacture, comprising a ring-opened lactide copolymer formed from an epoxide-functionalized lactide monomer and a bisphenol monomer.

2. The article of manufacture of claim 1, wherein the ring-opened lactide copolymer has the following structure:

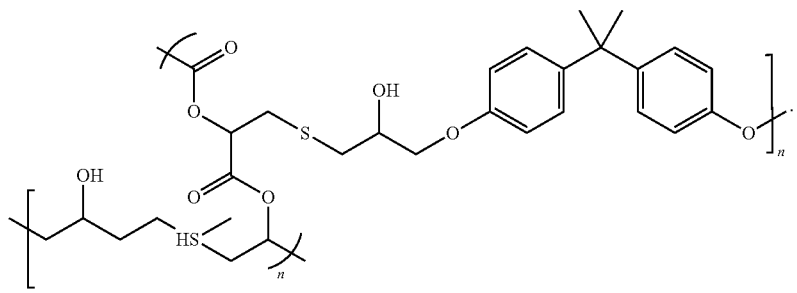

3. The article of manufacture of claim 1, wherein the ring-opened lactide copolymer has the following structure:

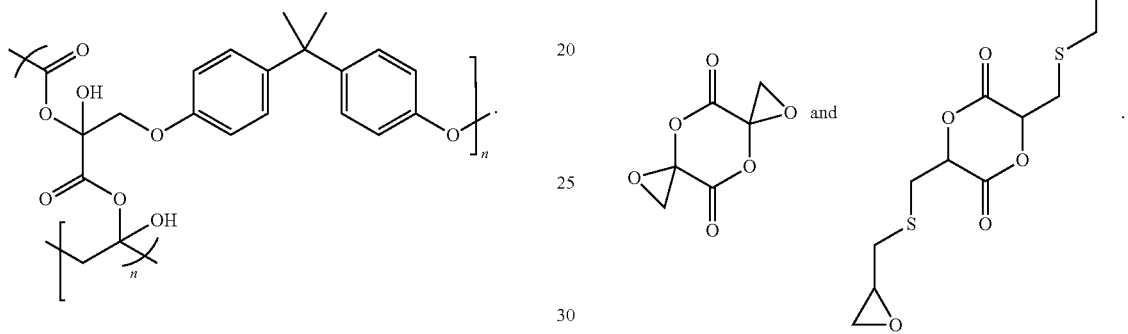

4. The article of manufacture of claim 1, wherein the ring-opened lactide copolymer is a component of a resin.

5. The article of manufacture of claim 4, wherein the resin is a thermoset epoxy resin.

6. The article of manufacture of claim 1, wherein the article of manufacture is selected from the group consisting of: a coating, an electrical insulator, a fiber-reinforced plastic, and an adhesive.

7. The article of manufacture of claim 1, wherein the ring-opened lactide copolymer is cross-linked by crosslinking moieties.

8. The article of manufacture of claim 7, wherein the crosslinking moieties are selected from the group consisting of epoxies, isocyanates, carbonates, esters, and combinations thereof.

9. The article of manufacture of claim 1, wherein the ring-opened lactide copolymer is formed in a process that includes a reaction to form a lactide copolymer.

10. The article of manufacture of claim 1, wherein the functionalized lactide monomer is selected from the group consisting of:

11. The article of manufacture of claim 1, wherein the ring-opened lactide copolymer is formed in a process that includes a ring-opening reaction with a lactide copolymer.

12. The article of manufacture of claim 11, wherein the ring-opening reaction includes mixing the lactide copolymer with a tin(II) octanoate material.

13. The article of manufacture of claim 1, wherein the epoxide-functionalized lactide monomer is formed in a reaction involving dimethylidene lactide.

14. The article of manufacture of claim 13, wherein the reaction includes reacting the dimethylidene lactide with 2-oxiranemethanethiol.

15. The article of manufacture of claim 7, wherein the cross-linking includes binding to hydroxyl groups on the ring-opened lactide copolymer.

* * * * *